Patented Feb. 23, 1937

2,071,555

UNITED STATES PATENT OFFICE 2,071,555

PROCESS FOR PRODUCING A COMPLETELY INSULATING AIR AND ACIDPROOF PROTECTIVE COATING ESPECIALLY FOR MIRRORS

Heinrich Meder, Dresden, Germany

No Drawing. Application March 3, 1932, Serial No. 596,578. In Germany April 14, 1931

3 Claims. (Cl. 134—26)

It is known that mirrors often become useless after a short time of exposure especially in bathrooms, steambaths and in dampness of tropical climates.

These alterations are chiefly due to the fact that the protective coating over the silver backing does not sufficiently insulate same.

The invention means an absolute revolution of the present day mirror manufacture, as it has never been possible to produce mirrors which resist the influences of permanent moisture.

The process of production of the new protective coating is carried out in the following manner:—

A mass is formed, composed of the following ingredients and specified quantities:—

40 parts by weight of natural asphalt are melted and diluted in spirits of turpentine or its equivalents.

30 parts by weight of copal resin are added thereto while continually stirring the mass. The resin is first melted and dissolved in spirits of turpentine or its equivalents.

This mass is allowed to simmer in a basin filled with hot water and when it has cooled, 10 parts by weight of red lead and 5 whites of egg or a corresponding quantity of dried white of egg powder is added to each kilogram of the mass until the same becomes relatively thin.

The egg albumin serves as binding medium, which has the property of preserving the flexibility of the protective coating against all kinds of moisture. The egg albumin intimately binds the mass and retains it in a permanently flexible condition. As each individual particle of the mass is surrounded by a film of egg albumin, the protective coating remains extremely elastic and consequently intact.

The coating mass, as herein set forth, has to be applied directly upon the silver backing in lukewarm condition, the coating composition as well as the glass with its silver backing being kept in lukewarm condition.

I claim:

1. A process for producing a protective coating against air, dampness, tropical moisture and acid vapors, consisting in melting 40 parts by weight of asphalt, diluting the same with spirits of turpentine, adding 30 parts by weight of copal resin dissolved in spirits of turpentine whilst continually stirring the mass, adding to each kilogram of the mixture 10 parts by weight of red lead and egg albumin in a quantity equivalent to five whites of eggs and applying this mass upon the coating of the mirror maintained in lukewarm condition.

2. A process as specified under 1, in which the egg albumin is added in its natural state.

3. A process as specified under 1, in which the egg albumin is used in the form of dry egg powder.

HEINRICH MEDER.